US010933999B2

(12) United States Patent
Blanck et al.

(10) Patent No.: US 10,933,999 B2
(45) Date of Patent: Mar. 2, 2021

(54) AIRCRAFT PASSENGER CABIN AREA COMPRISING A RESTRICTED AREA

(71) Applicant: Airbus Operations GmbH, Hamburg (DE)

(72) Inventors: Andreas Blanck, Hamburg (DE); Frank Cordes, Hamburg (DE); Jean-Baptiste Jaffrelot, Hamburg (DE); Jan Uwe Nehl, Hamburg (DE); Marcus Boerjesson, Hamburg (DE)

(73) Assignee: AIRBUS OPERATIONS GMBH, Hamburg (DE)

( * ) Notice: Subject to any disclaimer, the term of this patent is extended or adjusted under 35 U.S.C. 154(b) by 340 days.

(21) Appl. No.: 16/017,230

(22) Filed: Jun. 25, 2018

(65) Prior Publication Data

US 2018/0305025 A1 Oct. 25, 2018

Related U.S. Application Data

(63) Continuation of application No. PCT/EP2016/070650, filed on Sep. 1, 2016.

(51) Int. Cl.
*B64D 11/06* (2006.01)
*B64D 11/00* (2006.01)

(52) U.S. Cl.
CPC .......... *B64D 11/0639* (2014.12); *B64D 11/00* (2013.01); *B64D 11/0646* (2014.12); *B64D 11/0647* (2014.12); *B64D 11/0696* (2013.01)

(58) Field of Classification Search
CPC . B64D 11/00; B64D 11/0639; B64D 11/0646; B64D 11/064; B64D 11/0644;
(Continued)

(56) References Cited

U.S. PATENT DOCUMENTS 2,947,350 A * 8/1960 Davis ................... A47D 15/006
297/354.12
3,589,762 A * 6/1971 Henrikson ............... A47C 7/56
297/324
(Continued)

FOREIGN PATENT DOCUMENTS

DE 29617154 12/1996
DE 102006048978 4/2008
(Continued)

OTHER PUBLICATIONS

International Search Report, dated Nov. 1, 2016, priority document.
(Continued)

*Primary Examiner* — Medhat Badawi
(74) *Attorney, Agent, or Firm* — Greer, Burns & Crain, Ltd.

(57) ABSTRACT

An aircraft passenger cabin area comprises a main aisle extending substantially parallel to a longitudinal axis of the aircraft passenger cabin area, a restricted area, wherein a non-encroachable safety area is defined in the region of the restricted area, a transverse aisle connecting the main aisle to the restricted area and at least one passenger seat comprising a rigid carrier structure, a backrest and a seat element and arranged in the passenger cabin area adjacent to the transverse aisle such that the seat element faces the transverse aisle. The seat element is displaceable, relative to the backrest and carrier structure, in a direction substantially perpendicular to a longitudinal axis of the transverse aisle between a usable position and an out-of-use position. In its usable position, the seat element, protrudes into the safety area, but, in its out-of-use position, the seat element clears the safety area.

10 Claims, 5 Drawing Sheets

(58) Field of Classification Search
CPC . B64D 11/06; B64D 11/0601; B64D 11/0647; B64D 11/0696; B64D 25/00
See application file for complete search history.

(56) References Cited

U.S. PATENT DOCUMENTS

| | | | | |
|---|---|---|---|---|
| 3,762,766 | A * | 10/1973 | Barecki | B64D 11/0629 297/217.1 |
| 4,072,346 | A * | 2/1978 | Schueler | A47C 1/12 297/163 |
| 4,157,797 | A * | 6/1979 | Fox | B64D 11/06 244/122 R |
| 4,460,215 | A * | 7/1984 | Chamberlain | A47C 9/06 297/14 |
| 4,527,828 | A * | 7/1985 | Groce | B60N 2/3031 296/63 |
| 4,536,027 | A * | 8/1985 | Brennan | A47C 7/70 244/122 R |
| 4,679,749 | A * | 7/1987 | Ryan | B64D 11/06 244/122 R |
| 5,431,360 | A * | 7/1995 | Yu | B64D 25/04 105/345 |
| 5,829,836 | A * | 11/1998 | Schumacher | B60N 2/06 297/257 |
| 5,918,937 | A * | 7/1999 | Moffa | B60N 2/3047 297/324 |
| 6,481,798 | B2 * | 11/2002 | Romca | B64D 11/06 297/340 |
| 7,083,146 | B2 * | 8/2006 | Hiesener | B64D 11/06 244/118.6 |
| RE42,005 | E * | 12/2010 | Jost | E03C 1/057 4/623 |
| 8,401,742 | B2 * | 3/2013 | Schliwa | G06Q 10/06 701/49 |
| 9,187,176 | B2 * | 11/2015 | Boren | B64D 11/00 |
| 9,493,098 | B2 * | 11/2016 | Marchesi | B60N 2/3047 |
| 9,713,969 | B2 * | 7/2017 | Schomacker | B64D 11/06 |
| 9,868,505 | B2 * | 1/2018 | Childress | B60N 2/4279 |
| 10,259,586 | B2 * | 4/2019 | McIntosh | B64D 11/0697 |
| 10,370,106 | B2 * | 8/2019 | Papke | B64D 11/0023 |
| 10,556,692 | B2 * | 2/2020 | Fuerstenberg | B64D 11/0639 |
| 10,676,194 | B2 * | 6/2020 | Papke | B64D 11/0023 |
| 2003/0209929 | A1* | 11/2003 | Muin | B64D 11/0649 297/331 |
| 2004/0195450 | A1* | 10/2004 | Hiesener | B64D 11/064 244/118.5 |
| 2005/0140195 | A1* | 6/2005 | Koepke | A47C 1/03216 297/337 |
| 2018/0148178 | A1* | 5/2018 | Koehler | B64D 11/0698 |

FOREIGN PATENT DOCUMENTS

| | | |
|---|---|---|
| DE | 102010039409 A1 | 2/2012 |
| DE | 202012102557 | 10/2012 |
| EP | 1132294 A2 | 9/2001 |
| EP | 1452444 | 9/2004 |
| FR | 2754496 | 4/1998 |
| WO | 2012011452 | 1/2012 |

OTHER PUBLICATIONS

German Search Report, dated Aug. 5, 2016, priority document.
European Examination Report for European Patent Application No. 16758221.2 dated Aug. 16, 2019.

* cited by examiner

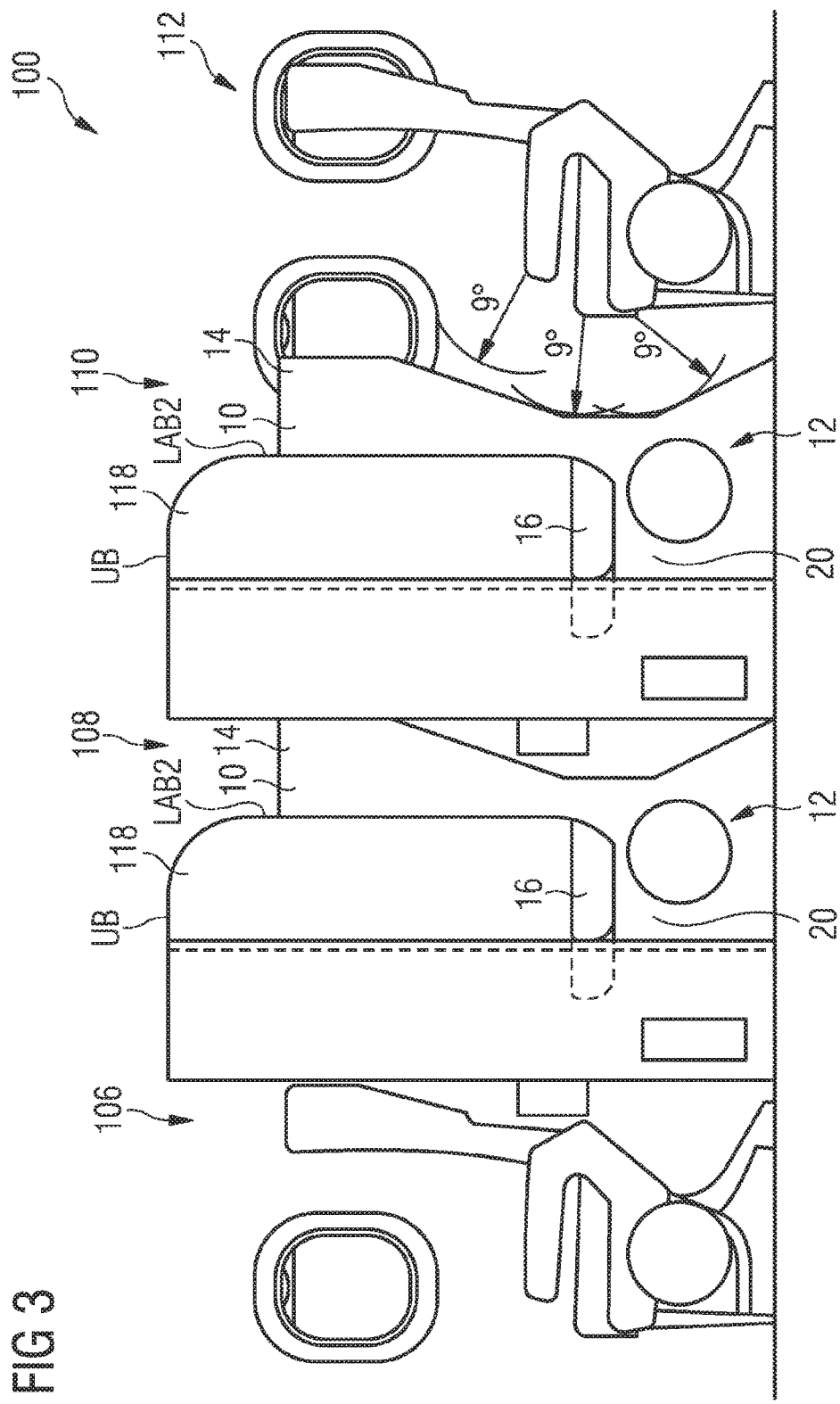

AIRCRAFT PASSENGER CABIN AREA COMPRISING A RESTRICTED AREA

CROSS-REFERENCES TO RELATED APPLICATIONS

This application is a continuation of International Application PCT/EP2016/070650 filed Sep. 1, 2016, designating the United States and published on Jun. 29, 2017 as WO 2017/108217. This application also claims the benefit of the German patent application No. 10 2015 226 664.8 filed on Dec. 23, 2015. The entire disclosures of the above are incorporated herein by way of reference.

BACKGROUND OF THE INVENTION

The invention relates an aircraft passenger cabin area which comprises a restricted area and other required space definitions such as, for example, a longitudinal aisle and a cross aisle.

In modern means of transport, particularly in aircraft, optimum utilization of the space available in a passenger cabin is of major economic importance. That is why, particularly in the economy class of an aircraft passenger cabin, seat rows that are arranged one behind another are positioned at the smallest possible distances from one another. In areas of an aircraft passenger cabin which are adjacent to emergency exits, however, it is necessary to provide, between seat rows that are arranged one behind another, transverse aisles which connect a main aisle extending along a longitudinal axis of the aircraft passenger cabin to the emergency exits which are located, for example, above the wings or other restricted areas. In order to make possible a rapid flow of passengers to the emergency exits in the event of an emergency evacuation, these transverse aisles must have a stipulated width of, for example, 7 to 10 inches (17.78 to 25.4 cm) or 13 inches (33.02 cm). Accordingly, seat rows bordering the transverse aisles have to be arranged at a relatively wide interval from one another.

SUMMARY OF THE INVENTION

The underlying object of the invention is to make available an aircraft passenger cabin area which comprises a restricted area, but still permits optimum utilization of the space available in an aircraft passenger cabin, while complying with all the safety requirements regarding dimensions of the access to the restricted area, for example an emergency exit.

An aircraft passenger cabin area comprises a main aisle which extends substantially parallel to a longitudinal axis of the aircraft passenger cabin area. In particular, one or two main aisles may be provided. Rows of passenger seats may be arranged one behind another along both sides of the main aisle. In a typical single aisle aircraft, each row of passenger seats comprises three seats on each side of the main aisle. The aircraft passenger cabin area further comprises a restricted area, for example an emergency exit which, in an emergency, serves to evacuate passengers from the aircraft passenger cabin. The emergency exit may be defined by an opening formed in a fuselage of an aircraft equipped with the aircraft passenger cabin area and may be closed by means of a door element which is suitable to be entirely removed so as to clear the opening formed in the fuselage of the aircraft. For example, in an emergency, the door element may be released from its attachment points at the fuselage of the aircraft and thereafter removed from the aircraft passenger cabin area.

In the region of the restricted area, a safety area is defined. The safety area is an area which may not be encroached by components installed within the aircraft passenger cabin area and thus serves to ensure an unhindered access to the restricted area. Preferably, a boundary line of the safety area at least partially surrounds an area of an emergency exit which may form the restricted area, wherein an outer boundary of the emergency exit area preferably is defined by an outer rim of the door element closing the opening formed in the aircraft fuselage. For example, the safety area may have an upper boundary line which extends at a distance of approximately 1 inch (approximately 2.54 cm) from an upper boundary of an emergency exit area. Lateral boundary lines of the safety area may extend at a distance of approximately 1 inch (approximately 2.54 cm) from lateral boundaries of the emergency exit area, at least along a substantial part of the lateral boundaries of the emergency exit area.

However, while the upper boundary line and a fwd lateral boundary line of the safety area, may be offset from the respective boundaries of the emergency exit area in an outward direction, an aft lateral boundary line and a lower boundary line of the safety area, at least in sections, may be offset from the respective boundaries of the emergency exit area in an inward direction, as will be explained in further detail below. Specifically, in a region of the aft lateral boundary line which is arranged adjacent to the lower boundary line and in a region of the lower boundary line, the safety area may not surround the emergency exit area, but instead may protrude into the emergency exit area. In the context of this application, the expression "fwd" is used to designate a direction which is directed towards a nose of an aircraft equipped with the aircraft passenger cabin area. The expression "aft" is used to designate a direction which is directed towards a tail of an aircraft equipped with the aircraft passenger cabin area.

The aircraft passenger cabin area further comprises a transverse aisle which connects the main aisle to the restricted area. While seat rows that are arranged one behind another in an aircraft passenger cabin, at least in the economy class, typically are positioned at the smallest possible distances from one another, the transverse aisle of the aircraft passenger cabin area, due to its purpose to provide access to the restricted area, for example in the form of an emergency exit from the main aisle for example in case of an emergency, typically has a stipulated width of, for example, 7 to 10 inches (17.78 to 25.4 cm) or 13 inches (33.02 cm).

At least one passenger seat is arranged in the aircraft passenger cabin area. The passenger seat comprises a rigid carrier structure, a backrest and a seat element. Furthermore, the passenger seat is arranged in the passenger cabin area adjacent to the transverse aisle in such a way that the seat element faces towards the transverse aisle. Basically, only one passenger seat may be arranged in the aircraft passenger cabin area. Preferably, however, at least one row of passenger seats which comprises, for example, three seats may be provided in the aircraft passenger cabin area, wherein the seats in said row may be arranged adjacent to the transverse aisle in such a way that their seat elements face towards the transverse aisle. The aircraft passenger cabin area may also be equipped with a further row of passenger seats that may be arranged in such a way that their backrests, i.e., backsides of their backrests face towards the transverse aisle. The transverse aisle then is arranged between the two rows of passenger seats.

The seat element of the at least one passenger seat is displaceable, relative to the backrest and the carrier structure, in a direction substantially perpendicular to a longitudinal axis of the transverse aisle between a usable position and an out-of-use position. In its usable position, the seat element may be arranged in such a way, relative to the backrest, that a front edge of the seat element which faces away from the backrest is arranged at a first distance from a backrest surface of said backrest. Here, the term "backrest surface" designates a front surface of the backrest against which a user of the passenger seat can lean in the usual way when sitting on the seating surface of the seat element. When the seat element is in its usable position, a seating surface of said seat element has a depth which corresponds to the first distance. This depth is preferably chosen in such a way that a user of the passenger seat can sit down comfortably on the seat element, i.e., on the seating surface of said seat element.

In its out-of-use position, on the other hand, the seat element may be received, at least partially, in a gap which is provided between a first portion of the carrier structure that carries the seat element and an edge of the backrest that faces towards the seat element. The front edge of the seat element then may be arranged at a second distance from the backrest surface of the backrest that is smaller than the first distance. When the seat element is in its out-of-use position, the seating surface of said seat element consequently has a depth which corresponds to the second distance and which is smaller than the depth that corresponds to the first distance. In its out-of-use position, the seat element thus protrudes less far from the backrest surface of the backrest in a direction perpendicular to the longitudinal axis of the transverse aisle, than in its usable position. As a result of the displacement of the seat element from its usable position into its out-of-use position, the size of the passenger seat in the direction perpendicular to the longitudinal axis of the transverse aisle can be reduced.

In its usable position, the seat element protrudes into the safety area defined in the region of the restricted area. To the contrary, in its out-of-use position, the seat element clears the safety area defined in the region of the restricted area. During normal operation of an aircraft equipped with the aircraft passenger cabin area, the passenger seat with the seat element arranged in its usable position may thus be used in the usual way and without any loss of comfort for a passenger sitting on said passenger seat. If, on the other hand, for example in case of an emergency, passengers are obliged to pass along the transverse aisle to the restricted area, the seat element can be displaced into its out-of-use position. As a result, the transverse aisle is widened and the safety area is cleared as required.

The aircraft passenger cabin area thus permits optimum utilization of the space available in the passenger cabin of an aircraft without impairing the comfort of passengers traveling in the aircraft passenger cabin area. At the same time, the aircraft passenger cabin area complies with all the safety requirements regarding dimensions of accesses to restricted areas.

In a preferred embodiment of the aircraft passenger cabin area, the restricted area is an emergency exit, in particular an overwing exit, i.e., an emergency exit that is located above a wing of an aircraft equipped with the aircraft passenger cabin area. A transverse aisle that connects the main aisle of the aircraft passenger cabin area to an overwing emergency exit typically extends between two rows of passenger seats which should possibly be arranged as close one behind another as possible. The design of the aircraft passenger cabin area allows to achieve this goal while still complying with all the safety requirements which ensure an unhindered access to the overwing emergency exit in case of an emergency.

The aircraft passenger cabin area may further comprise a compressible object arrangement area which is disposed adjacent to the safety area. In the compressible object arrangement area, a compressible object, i.e., an object which has a soft structure and which can be reduced in size by the application of a pressure, may be arranged. Preferably, the compressible object arrangement area protrudes into an emergency exit area, i.e., an area defined by the outer rim of an emergency exit door element closing the opening formed in the aircraft fuselage. For example, the compressible object arrangement area may be arranged adjacent to a region of the aft lateral boundary of the emergency exit area which is arranged adjacent to the lower boundary of the emergency exit area and may extend along an aft region of the lower boundary of the emergency exit area within the emergency exit area. The provision of a compressible object arrangement area which protrudes into the emergency exit area does not violate any safety requirements, since the presence of a compressible object which, by the application of a pressure, can be reduced in size, does not affect an unhindered access to a restricted area in the form of an emergency exit.

The seat element of the passenger seat arranged in the aircraft passenger cabin area may comprise a compressible seat cushion which protrudes from the compressible object arrangement area into the safety area, when the seat element is arranged in its usable position. To the contrary, when the seat element is arranged in its out-of-use position, the compressible seat cushion of the seat element clears the safety area. During normal operation of an aircraft equipped with the aircraft passenger cabin area, the passenger seat with the seat element arranged in its usable position thus provides a high comfort for a passenger sitting on said passenger seat. For example, in case of an emergency, however, when the seat element is arranged in its out-of-use position, the seat cushion is entirely arranged within the compressible object arrangement area in compliance with all safety requirements.

Dimensions of the compressible object arrangement area may depend on the width of the transverse aisle. Simultaneously or alternatively, a shape of the compressible object arrangement area may depend on the width of the transverse aisle.

In particular, a compressible object arrangement area associated with a transverse aisle having a first width may extend further from an aft extension of a lower boundary line of the safety area in a direction perpendicular to the longitudinal axis of the transverse aisle and perpendicular to a longitudinal axis of the main aisle, i.e., upwards into an emergency exit area, than a compressible object arrangement area associated with a transverse aisle having a second width that is smaller than the first width.

In particular, the compressible object arrangement area may extend from the aft extension of the lower boundary line of the safety area in a direction perpendicular to the longitudinal axis of the transverse aisle and perpendicular to the longitudinal axis of the main aisle by approximately 4 inches (10.16 cm), in case the width of the transverse aisle is larger than 10 inches (25.4 cm). To the contrary, the compressible object arrangement area may extend from the aft extension of the lower boundary line of the safety area in a direction perpendicular to the longitudinal axis of the transverse aisle and perpendicular to the longitudinal axis of the main aisle by approximately 2 inches (approximately 5.08 cm), in case the width of the transverse aisle is between approximately 7 and 10 inches (between approximately 17.78 and 25.4 cm).

Furthermore, a compressible object arrangement area associated with a transverse aisle having a first width may extend less far from a lower extension of an aft lateral boundary line of the safety area in a direction perpendicular to the longitudinal axis of the transverse aisle and parallel to the longitudinal axis of the main aisle, i.e., in the fwd direction into an emergency exit area, than a compressible object arrangement area associated with a transverse aisle having a second width that is smaller than the first width.

The rigid carrier structure of the at least one passenger seat may comprise a first portion which carries the seat element. Preferably, the first portion of the rigid carrier structure is arranged outside of the safety area. As a result, unhindered access to a restricted area in the form of an emergency exit is ensured.

For example, the first portion of the rigid carrier structure may be arranged at a distance of approximately 0 to 0.7 inches (approximately 0 to 1.78 cm) from an outer boundary line, in particular the lower boundary line, of the safety area. Such an arrangement makes optimum use of the space available in the aircraft passenger cabin area while still ensuring that the safety area is not encroached.

A backrest surface of the backrest of the at least one passenger seat which faces the transverse aisle preferably is arranged at a distance of approximately 0 to 0.7 inches (0 to 1.78 cm) from an outer boundary line, in particular the aft lateral boundary line of the safety area. Again, this arrangement makes a particular efficient use of the available space without affecting an unhindered access to a restricted area in the form of an emergency exit.

BRIEF DESCRIPTION OF THE DRAWINGS

A preferred embodiment of the invention will now be explained in greater detail with the aid of the appended diagrammatic drawings, in which:

FIG. 3 shows a view of the aircraft passenger cabin area according to FIG. 1 which in particular illustrates the relative positions of a passenger seat and an emergency exit;

DETAILED DESCRIPTION OF THE PREFERRED EMBODIMENTS

Figure 1:
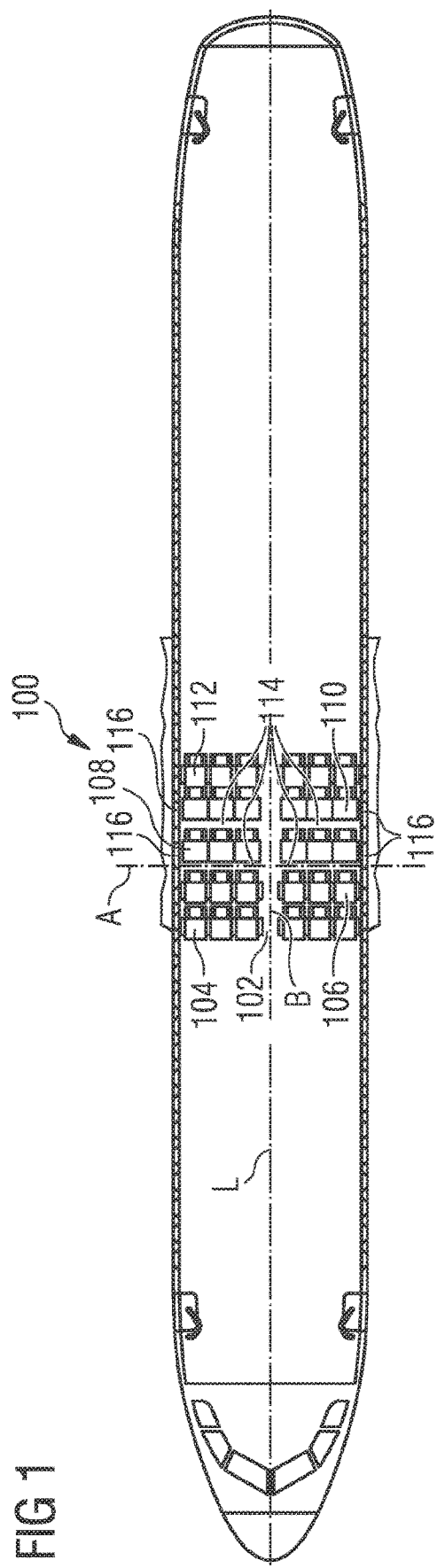
FIG. 1 shows aircraft passenger cabin comprising an area in which a number of passenger seats are arranged.

FIG. 1 shows an aircraft passenger cabin area 100 which forms part of an aircraft passenger cabin. The aircraft passenger cabin area 100 comprises a main aisle 102 which extends substantially parallel to a longitudinal axis L of the passenger cabin area 100. Installed in the passenger cabin area 100 are a number of passenger seat rows 104, 106, 108, 110, 112. Transverse aisles 114, which connect the main aisle 102 to restricted areas in the form of emergency exits 116, are provided between passenger seat rows 106 and 108 and passenger seat rows 108 and 110. In the embodiment of an aircraft passenger cabin area 100 shown in FIG. 1, the emergency exits 116 are positioned above the wings of the aircraft.

The transverse aisles 114 must have a stipulated width in order to be able to guarantee an adequate flow of passengers along said transverse aisles 114 to the emergency exits 116 in the event of an emergency evacuation of the aircraft passenger cabin. For this reason, in the arrangement according to FIG. 1, the distance between passenger seats arranged one behind another in passenger seat rows 106 and 108, and passenger seats arranged one behind another in passenger seat rows 108 and 110, is greater than the distance between passenger seats arranged one behind another in passenger seat rows 104 and 106, and passenger seats arranged one behind another in passenger seat rows 110 and 112.

Figure 2A:
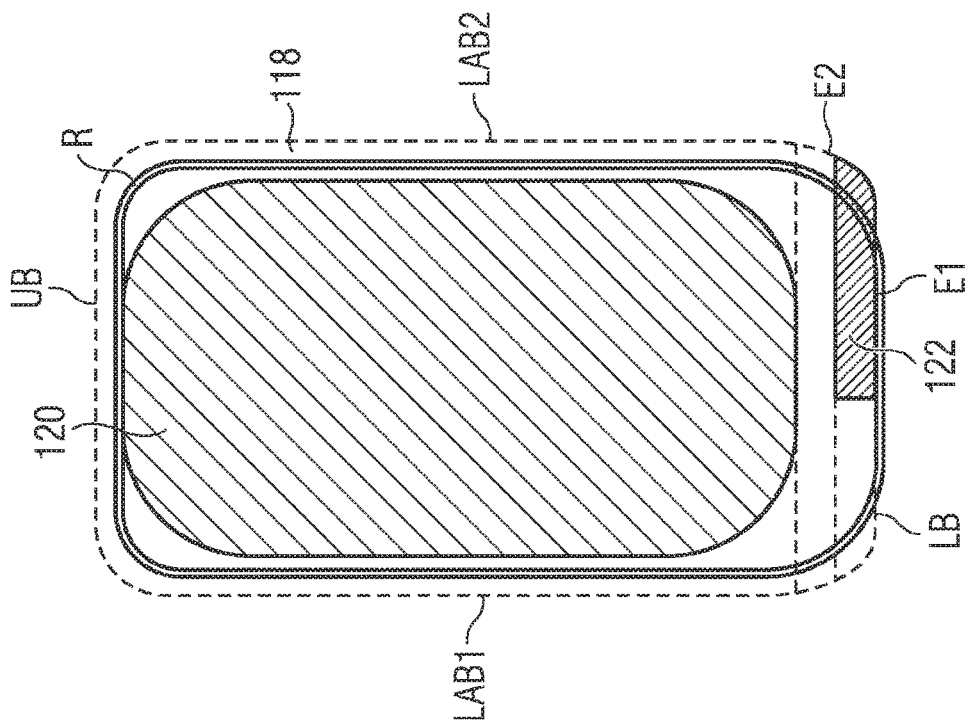
FIGS. 2a and b show a restricted area in the form of an emergency exit arranged in the aircraft passenger cabin area according to FIG. 1 as well as a safety area and two embodiments of a compressible object arrangement area defined in the region of the emergency exit.

As shown in FIGS. 2a and b, in the region of each emergency exit 116, a safety area 118 is defined. The safety area 118 is an area which may not be encroached by components installed within the aircraft passenger cabin area 100 and thus serves to ensure an unhindered access to the emergency exit 116. In FIG. 2, a boundary line of the safety area 118 is indicated by the dashed line. The boundary line of the safety area 118 partially surrounds emergency exit area, i.e., an outer rim R of a door element 120 closing an opening formed in a fuselage of the aircraft. In particular, an upper boundary line UB of the safety area 118 extends at a distance of approximately 1 inch (approximately 2.54 cm) from an upper boundary of the emergency exit area line. A fwd lateral boundary line LAB1 of the safety area 118, over its entire length, extends at a distance of approximately 1 inch (approximately 2.54 cm) from a fwd lateral boundary of the emergency exit area. To the contrary, an aft lateral boundary line LAB2 of the safety area 118, only in a region adjacent to the upper boundary line UB, extends at a distance of approximately 1 inch (approximately 2.54 cm) from an aft lateral boundary of the emergency exit area.

While the upper boundary line UB, the fwd lateral boundary line LAB1 and the upper part of the aft lateral boundary line LAB2 of the safety area 118 are offset from the respective boundaries of the emergency exit area in an outward direction, a lower part of the aft lateral boundary line LAB2 which is arranged adjacent to a lower boundary line LB of the safety area 118, and the lower boundary line LB of the safety area 118 are offset from the respective boundaries of the emergency exit area in an inward direction. Thus, in the region of the lower part of its aft lateral boundary line LAB2 and in the region of its lower boundary line LB, the safety area 118 does not surround the emergency exit area, but instead protrudes into the emergency exit area.

The aircraft passenger cabin area 100 further comprises a compressible object arrangement area 122 which is disposed adjacent to the safety area 118. In the compressible object arrangement area 118, a compressible object, i.e., an object which has a soft structure and which can be reduced in size by the application of a pressure, may be arranged. As becomes apparent from FIGS. 2a and b, the compressible object arrangement area 122 protrudes into the emergency exit area. In particular, the compressible object arrangement area 122 is arranged adjacent to a region of an aft lateral boundary of the emergency exit area which is arranged adjacent to the lower boundary of the emergency exit area and extends along an aft region of the lower boundary of the emergency exit area within the emergency exit area. The provision of a compressible object arrangement area 122 which protrudes into the emergency exit area does not violate any safety requirements, since the presence of a compressible object which, by the application of a pressure, can be reduced in size, does not affect an unhindered access to the emergency exit 116.

As becomes apparent from a comparison of FIGS. 2a and b, dimensions and shape of the compressible object arrangement area 122 depend on the width of the transverse aisle 114 provided in the aircraft passenger cabin area 100. While FIG. 2a shows an emergency exit 116, which is arranged adjacent to and accessible via a transverse aisle 114 having a first width that is larger than 10 inches (25.4 cm), FIG. 2b depicts an emergency exit 116, which is arranged adjacent to and accessible via a transverse aisle 114 having a second width of only approximately 7 to 10 inches (approximately 17.78 to 25.4 cm).

Figure 2B:
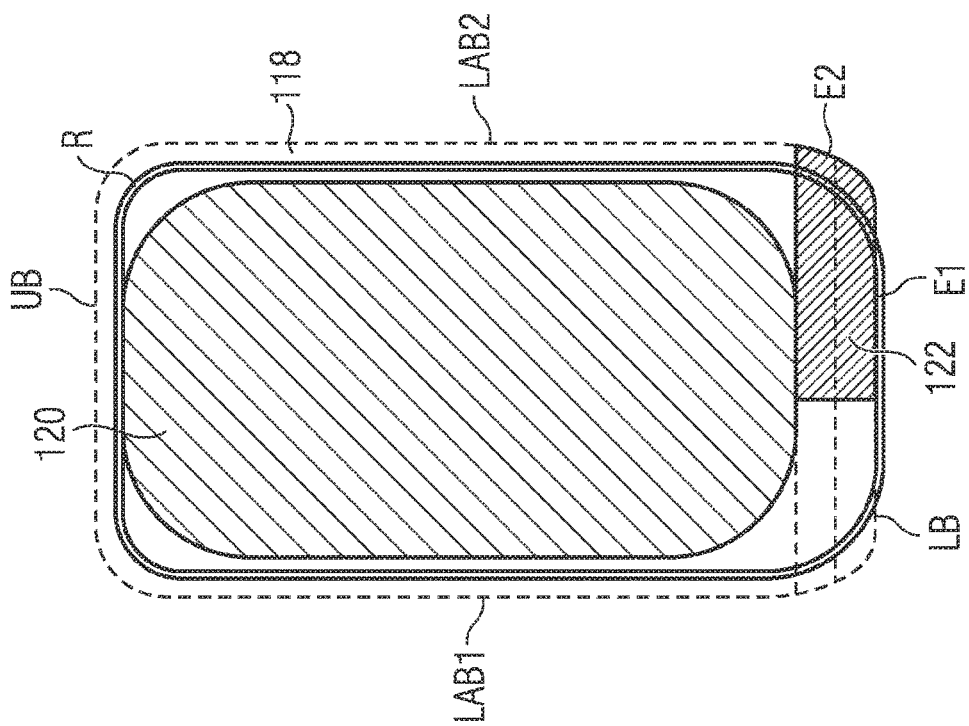

A comparison of FIGS. 2a and b shows that the compressible object arrangement area 122 associated with the transverse aisle 114 having the first width (see FIG. 2a) extends further from an aft extension E1 of the lower boundary line LB of the safety area 118 in a direction perpendicular to a longitudinal axis A of the transverse aisle 114 and perpendicular to a longitudinal axis B of the main aisle 102, i.e., further upwards into the emergency exit area, than the compressible object arrangement area 122 associated with the transverse aisle 114 having the second width that is smaller than the first width (see FIG. 2b).

In particular, in the arrangement of FIG. 2a, wherein the width of the transverse aisle 114 is larger than 10 inches (25.4 cm), the compressible object arrangement area 122 extends from the aft extension E1 of the lower boundary line LB of the safety area 118 in a direction perpendicular to the longitudinal axis A of the transverse aisle 114 and perpendicular to the longitudinal axis B of the main aisle 102 by approximately 4 inches (10.16 cm). To the contrary, in the arrangement of FIG. 2b, wherein the width of the transverse aisle 114 is between approximately 7 and 10 inches (between approximately 17.78 and 25.4 cm), the compressible object arrangement area 122 extends from the aft extension E1 of the lower boundary line LB of the safety area 118 in a direction perpendicular to the longitudinal axis A of the transverse aisle 114 and perpendicular to the longitudinal axis B of the main aisle 102 by approximately 2 inches (approximately 5.08 cm).

Further, the compressible object arrangement area 122 associated with the transverse aisle 114 having the first width (see FIG. 2a) extends less far from a lower extension E2 of the aft lateral boundary line LAB2 of the safety area 118 in a direction perpendicular to the longitudinal axis A of the transverse aisle 114 and parallel to the longitudinal axis B of the main aisle 102, i.e., further in a fwd direction into the emergency exit area, than the compressible object arrangement area 122 associated with the transverse aisle 114 having the second width that is smaller than the first width (see FIG. 2b).

Figure 4:
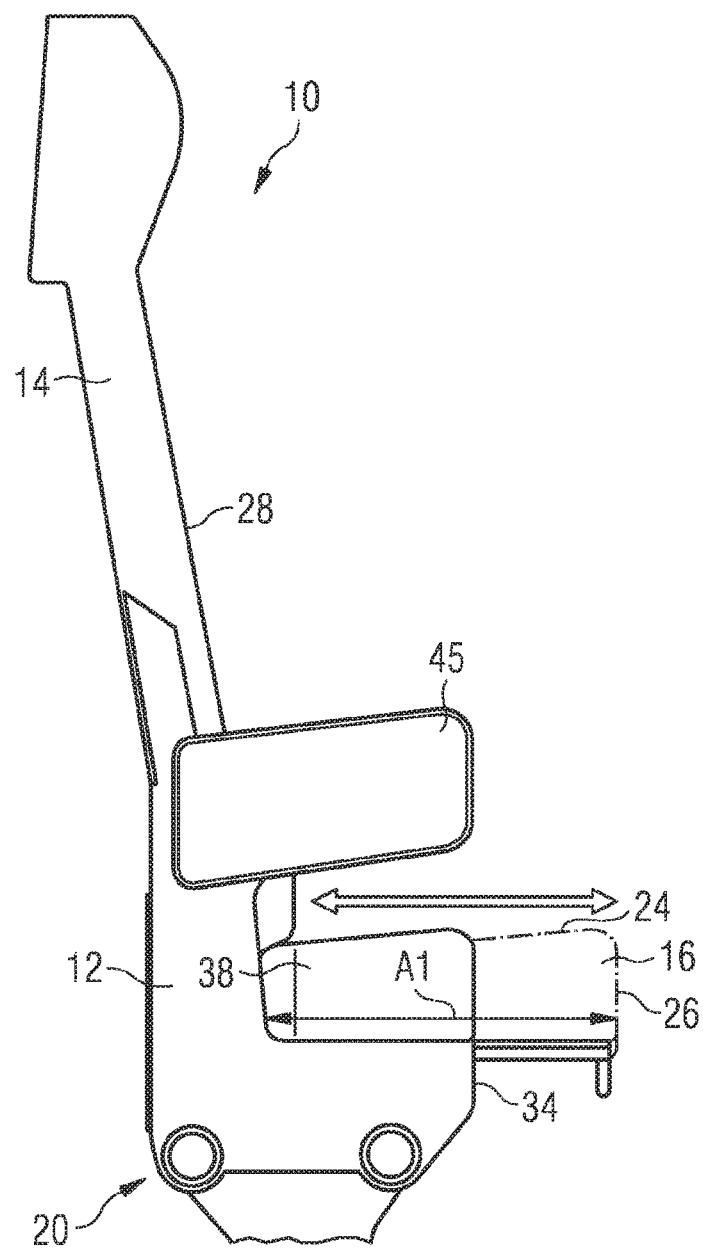
FIG. 4 shows a side view of a passenger seat which is suitable for installation in the passenger cabin area according to FIG. 1 and has a seat element which is arranged in a usable position.
Figure 5:
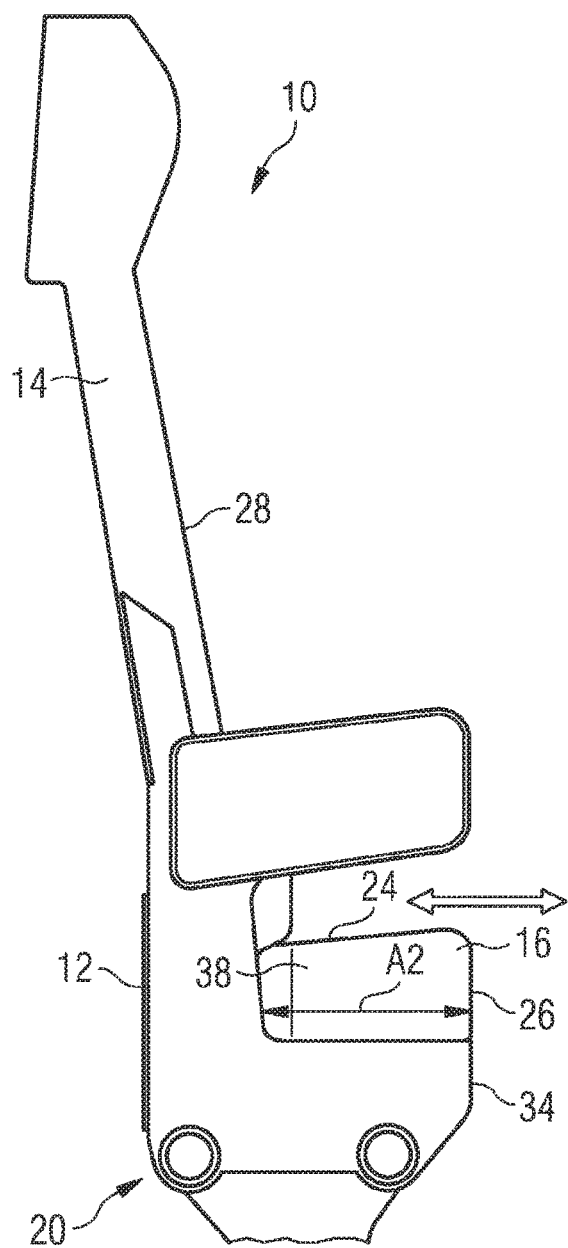
FIG. 5 shows a side view of the passenger seat according to FIG. 4, with a seat element arranged in an out-of-use position for clearing the exit areas.

Seat rows 108 and 110 of the aircraft passenger cabin area 100 are equipped with passenger seats 10 as schematically illustrated in FIG. 3 and depicted in greater detail in FIGS. 4 and 5. Each passenger seat 10 comprises a rigid carrier structure 12, a backrest 14 and a seat element 16. The seat element 16 comprises a compressible seat cushion 38. The passenger seats 10 are arranged in the passenger cabin area 100 adjacent to the transverse aisle 114 in such a way that their seat elements face towards the transverse aisle 114.

The seat element 16 of each passenger seat 10 is displaceable, relative to the backrest 14 and the carrier structure 12, in a direction substantially perpendicular to the longitudinal axis A of the transverse aisle 114 and substantially parallel to the longitudinal axis B of the main aisle 102 between a usable position indicated by a dash-dotted line in FIG. 4 and an out-of-use position illustrated in FIG. 5. In its usable position, the seat element 16 is arranged in such a way, relative to the backrest 14, that a front edge 26 of the seat element 16 which faces away from the backrest 14 is arranged at a first distance A1 from a backrest surface 28 of the backrest 14. When the seat element 16 is in its usable position, a seating surface 24 of the seat element 16 has a depth which corresponds to the first distance A1. This depth is preferably chosen in such a way that a user of the passenger seat 10 can sit down comfortably on the seat element 16, i.e., on the seating surface 24 of said seat element 16.

In its out-of-use position, on the other hand, the seat element 16 is received, at least partially, in a gap which is provided between a first portion 20 of the carrier structure 12 that carries the seat element 16 and an edge of the backrest 14 that faces towards the seat element 16. The front edge 26 of the seat element 16 then is arranged at a second distance A2 from the backrest surface 28 of the backrest 14 that is smaller than the first distance A2. When the seat element 16 is in its out-of-use position, the seating surface 24 of the seat element 16 consequently has a depth which corresponds to the second distance A2 and which is smaller than the depth that corresponds to the first distance A2. In its out-of-use position, the seat element 16 thus protrudes less far from the backrest surface 28 of the backrest 14 in a direction perpendicular to the longitudinal axis A of the transverse aisle and parallel to the longitudinal axis B of the main aisle 102, than in its usable position. As a result of the displacement of the seat element 16 from its usable position into its out-of-use position, the size of the passenger seat 10 in the direction perpendicular to the longitudinal axis A of the transverse aisle 114 and parallel to the longitudinal axis B of the main aisle 102, i.e., in the fwd direction can be reduced.

As shown for seat row 108 in FIG. 3, in its usable position, the seat element 16, in the fwd direction, protrudes into the safety area 118 defined in the region of the emergency exit 116. To the contrary, as shown for seat row 110 in FIG. 3, in its out-of-use position, the seat element 16 clears the safety area 116 defined in the region of the emergency exit 16. During normal operation of an aircraft equipped with the aircraft passenger cabin area 100, the passenger seat 10 with the seat element 16 arranged in its usable position may thus be used in the usual way and without any loss of comfort for a passenger sitting on the passenger seat 10. If, on the other hand, for example in case of an emergency, passengers are obliged to pass along the transverse aisle 114 to the emergency exit 116, the seat element 16 can be displaced into its out-of-use position. As a result, the transverse aisle 114 is widened and the safety area 16 is cleared as required.

Furthermore, the compressible seat cushion 38 of the seat element 16 protrudes from the compressible object arrangement area 122, in the fwd direction, into the safety area 118, when the seat element 16 is arranged in its usable position. To the contrary, when the seat element 16 is arranged in its out-of-use position, the compressible seat cushion 38 is entirely arranged within the compressible object arrangement area 122 and hence clears the safety area 118.

To the contrary, as shown in FIG. 3, the first portion 20 of the rigid carrier structure 12 of the passenger seat 10 which carries the seat element is arranged outside of the safety area 118. In particular, the first portion 20 of the rigid carrier structure 12 is arranged at a distance of approximately 0 to 0.7 inches (approximately 0 to 1.78 cm) from the lower boundary line LB of the safety area 118. Furthermore, a front edge 34 of the first portion 20 of the rigid carrier structure 12 is does not protrude into the safety area 118, in the fwd direction. The backrest surface 28 of the backrest 14 of the passenger seat 10 which faces the transverse aisle 114 is arranged at a distance of approximately 0 to 0.7 inches (0 to 1.78 cm) from the aft lateral boundary line LAB2 of the safety area 118. This arrangement makes a particular efficient use of the available space within the aircraft passenger cabin area 100 without affecting an unhindered access to the emergency exit 116.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. An aircraft passenger cabin area which comprises:
a main aisle which extends substantially parallel to a longitudinal axis of the aircraft passenger cabin area;
a restricted area, wherein an unencroachable safety area is defined in a region of the restricted area and is not encroached by components installed within the aircraft passenger cabin;
a compressible object arrangement area disposed adjacent to the safety area comprising a compressible object which, by an application of a pressure, is reduced in size;
a transverse aisle which connects the main aisle to the restricted area; and
at least one passenger seat which comprises a rigid carrier structure, a backrest and a seat element, the at least one passenger seat arranged in the passenger cabin area adjacent to the transverse aisle wherein the seat element faces towards the transverse aisle,
wherein the seat element is displaceable independently, relative to the backrest and the carrier structure, in a direction substantially perpendicular to a direction of a length of the transverse aisle between a usable position and an out-of-use position, wherein the seat element, in the usable position, protrudes into the safety area defined in the region of the restricted area, but, in the out-of-use position, clears the safety area defined in the region of the restricted area,
wherein the seat element comprises a compressible seat cushion which protrudes from the compressible object arrangement area into the safety area, when the seat element is arranged in the usable position, and the compressible seat cushion clears the safety area, when the seat element is arranged in the out-of-use position by being entirely arranged within the compressible object arrangement area.

2. The aircraft passenger cabin area according to claim 1, wherein the restricted area is an emergency exit or another restricted area.

3. The aircraft passenger cabin area according to claim 1, wherein at least one of dimensions or a shape of the compressible object arrangement area depend on a width of the transverse aisle.

4. The aircraft passenger cabin area according to claim 3, wherein a compressible object arrangement area associated with a transverse aisle having a first width extends further from an aft extension of a lower boundary line of the safety area in a direction perpendicular to the direction of the length of the transverse aisle and perpendicular to a longitudinal axis of the main aisle than a compressible object arrangement area associated with a transverse aisle having a second width that is smaller than the first width.

5. The aircraft passenger cabin area according to claim 3, wherein the compressible object arrangement area extends from an aft extension of a lower boundary line of the safety area in a direction perpendicular to the direction of the length of the transverse aisle and perpendicular to the longitudinal axis of the main aisle by approximately 4 inches when the width of the transverse aisle is larger than 10 inches.

6. The aircraft passenger cabin area according to claim 3, wherein the compressible object arrangement area extends from an aft extension of a lower boundary line of the safety area in a direction perpendicular to the direction of the length of the transverse aisle and perpendicular to the longitudinal axis of the main aisle by approximately 2 inches when the width of the transverse aisle is between approximately 7 and 10 inches.

7. The aircraft passenger cabin area according to claim 3, wherein a compressible object arrangement area associated with a transverse aisle having a first width extends less far from a lower extension of an aft lateral boundary line of the safety area in a direction perpendicular to the direction of the length of the transverse aisle and parallel to the longitudinal axis of the main aisle than a compressible object arrangement area associated with a transverse aisle having a second width that is smaller than the first width.

8. The aircraft passenger cabin area according to claim 1, wherein the rigid carrier structure of the at least one passenger seat comprises a first portion which carries the seat element, wherein the first portion of the rigid carrier structure is arranged outside of the safety area.

9. The aircraft passenger cabin area according to claim 8, wherein the first portion of the rigid carrier structure is arranged at a distance of approximately 0 to 0.7 inches from any outer boundary line of the safety area.

10. The aircraft passenger cabin area according to claim 1, wherein a backrest surface of the backrest of the at least one passenger seat which faces the transverse aisle is arranged at a distance of approximately 0 to 0.7 inches from any outer boundary line of the safety area.

* * * * *